United States Patent
Novick et al.

(10) Patent No.: US 12,225,003 B2
(45) Date of Patent: Feb. 11, 2025

(54) SYSTEM, DEVICE, AND METHOD OF CROSS-CHANNEL USER AUTHENTICATION

(71) Applicant: BioCatch Ltd., Tel Aviv (IL)

(72) Inventors: Itai Novick, Rehovot (IL); Gad Mazor, Ramat Efal (IL); Iris Eidelsztein, Bror Hayil (IL)

(73) Assignee: BIOCATCH LTD., Tel Aviv (IL)

( * ) Notice: Subject to any disclaimer, the term of this patent is extended or adjusted under 35 U.S.C. 154(b) by 310 days.

(21) Appl. No.: 18/078,962

(22) Filed: Dec. 11, 2022

(65) Prior Publication Data

US 2024/0195801 A1    Jun. 13, 2024

(51) Int. Cl.
*H04L 9/40* (2022.01)
*G06Q 40/02* (2023.01)

(52) U.S. Cl.
CPC .......... *H04L 63/083* (2013.01); *G06Q 40/02* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 7,100,049 B2 * | 8/2006 | Gasparini | H04L 67/02 713/176 |
| 7,606,560 B2 * | 10/2009 | Labrou | G06Q 20/4014 713/172 |
| 8,250,634 B2 * | 8/2012 | Agarwal | H04L 45/72 726/8 |
| 8,474,014 B2 * | 6/2013 | Headley | H04L 63/0838 726/4 |
| 8,649,766 B2 * | 2/2014 | Kemshall | H04L 63/0853 455/410 |
| 8,874,770 B2 * | 10/2014 | Ruff | H04L 1/1621 709/229 |
| 8,893,255 B1 * | 11/2014 | Martini | H04L 67/564 709/238 |
| 9,374,369 B2 * | 6/2016 | Mahaffey | G06F 21/6245 |
| 9,871,791 B2 * | 1/2018 | Blinn | G06F 21/34 |
| 9,934,502 B1 * | 4/2018 | Grassadonia | H04W 12/06 |
| 9,973,490 B2 * | 5/2018 | Huang | H04L 63/0815 |

(Continued)

*Primary Examiner* — Backhean Tiv
(74) *Attorney, Agent, or Firm* — AlphaPatent Associates Ltd.; Daniel J. Swirsky

(57) ABSTRACT

Cross-channel user authentication is provided, to increase resilience of a computerized system to cyber-attacks and to fraudulent transactions. In a demonstrative scenario, a user utilizes his web browser on his laptop computer to log-in to a web server; which in turn extracts the IP address of the laptop computer. The web server triggers an application server to send a Push Notification to a Mobile App that had been installed on a smartphone of that user who just logged in; and that Push Notification causes that smartphone to respond to the application server with the IP address of the smartphone. If the IP address of the computer is not identical to the IP address of the smartphone, then the servers determine that the log-in attempt on the computer was possibly fraudulent, and fraud mitigation operations are initiated. Optionally, geo-location data, device orientation data, device motion data, or other parameters are used as part of the cross-channel authentication process.

20 Claims, 1 Drawing Sheet

(56) References Cited

U.S. PATENT DOCUMENTS

| | | | |
|---|---|---|---|
| 10,102,524 B2* | 10/2018 | Vridhachalam | G06F 21/40 |
| 10,311,423 B2* | 6/2019 | Bakshi | G06Q 20/327 |
| 10,587,614 B2* | 3/2020 | Brown | H04L 63/101 |
| 10,701,064 B2* | 6/2020 | Nair | H04L 9/0863 |
| 10,742,645 B2* | 8/2020 | Hevizi | H04W 4/60 |
| 10,897,358 B2* | 1/2021 | Neumann | H04L 63/08 |
| 10,911,441 B2* | 2/2021 | Cronkright | H04L 63/083 |
| 11,025,618 B2* | 6/2021 | Pal | H04W 12/068 |
| 11,070,549 B2* | 7/2021 | Sarin | G06V 40/1365 |
| 11,218,473 B2* | 1/2022 | Cheek | H04L 63/1466 |
| 11,329,979 B1* | 5/2022 | Prasad | H04L 63/0853 |
| 11,347,879 B2* | 5/2022 | Griffin | H04L 63/205 |
| 11,558,380 B2* | 1/2023 | Kaidi | H04L 63/1483 |
| 11,870,773 B2* | 1/2024 | Kaditz | H04L 67/10 |
| 11,871,226 B2* | 1/2024 | Maufort | H04W 12/63 |
| 11,876,801 B2* | 1/2024 | Smith | H04L 9/3265 |
| 11,914,419 B2* | 2/2024 | Sepulveda | G06F 3/04847 |
| 11,962,586 B2* | 4/2024 | Gujarathi | H04W 12/63 |
| 11,979,390 B2* | 5/2024 | Killoran, Jr. | G06Q 20/385 |
| 12,021,866 B2* | 6/2024 | Shaffer | H04L 63/18 |
| 2007/0056022 A1* | 3/2007 | Dvir | H04L 63/08 726/4 |
| 2008/0189185 A1* | 8/2008 | Matsuo | G06Q 40/02 705/23 |
| 2015/0254634 A1* | 9/2015 | Fisher | G06Q 20/108 705/40 |
| 2016/0092696 A1* | 3/2016 | Guglani | G06F 21/606 726/26 |
| 2018/0276647 A1* | 9/2018 | Geupel | G06Q 20/4012 |
| 2021/0311710 A1* | 10/2021 | Aun | H04L 67/146 |
| 2022/0129903 A1* | 4/2022 | Sambhar | G06Q 20/308 |
| 2023/0222212 A1* | 7/2023 | Mullins | G06F 21/54 726/26 |
| 2024/0045746 A1* | 2/2024 | Smith | H04L 67/10 |
| 2024/0195801 A1* | 6/2024 | Novick | H04L 63/083 |

* cited by examiner

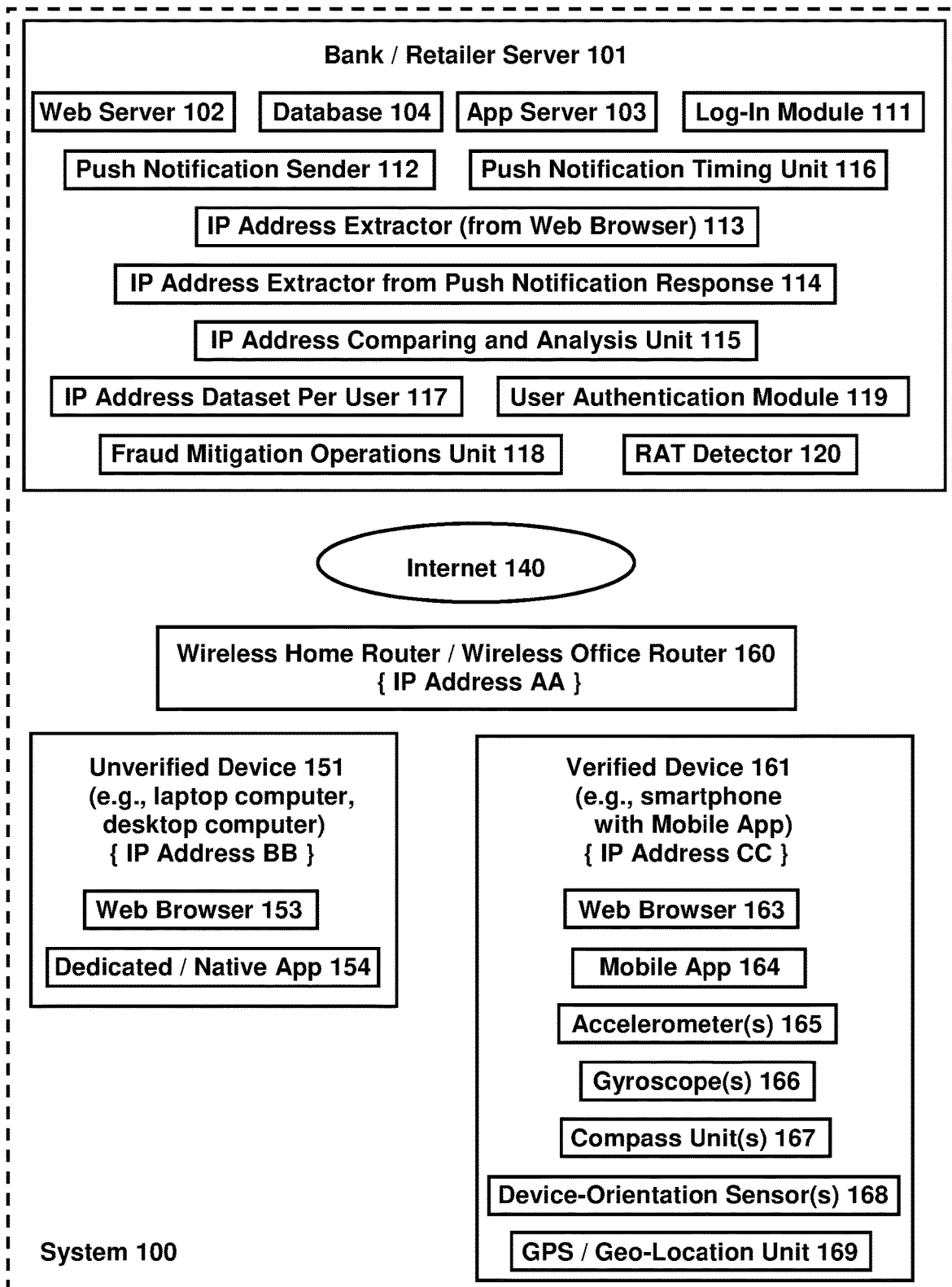

SYSTEM, DEVICE, AND METHOD OF CROSS-CHANNEL USER AUTHENTICATION

FIELD

Some embodiments are related to the field of computerized systems and electronic devices.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments include devices, systems, and methods of cross-channel user authentication, and/or verification that a user who is performing (or, who recently performed) a log-in process is indeed a legitimate user or the genuine account-owner and not an attacker or impostor.

In a demonstrative example, genuine user Gene has a bank account at Example-Bank. User Gene has installed on his smartphone the mobile application ("mobile app") of Example-Bank. Later, User Gene utilizes a web browser on his laptop computer at his home, to log-in into his online account on the website of Example-Bank. The laptop is connected to a home Wi-Fi network at the home of User Gene, operated via a wireless router having an Internet Protocol (IP) address of 191.192.193.194. The web server of Example-Bank thus observes that the IP address from which the log-in session was performed is 191.192.193.194. The server of Example-Bank looks up the account of User Gene, and observes that User Gene has installed on his smartphone the mobile app of Example-Bank. Then, the server of Example-Bank sends a push notification to the mobile app that is installed on the smartphone of Example Bank; and this enables the server of Example-Bank to extract or to determine the IP address of the smartphone of User Gene. The server of Example-Bank thus determines, via that push notification, that the smartphone of User Gene has the same IP address of 191.192.193.194; for example, since the smartphone of User Gene is located inside the pocket of the pants of User Gene, or is resting on a nearby table in the same home of User Gene. The server of Example-Bank thus determines that it is more likely that the user, who has just logged-in to the banking website of Example-Bank and entered the credentials of User Gene, is indeed the genuine User Gene; and is not a remotely-located attacker. In contrast, if Attacker Atkins uses his laptop computer to enter the stolen banking credentials of User Gene, then the server of Example-Bank would observe that the IP address of that laptop (utilized by Attacker Atkins) has an IP address (such as 205.206.207.208) that is different from the IP address obtained via a push notification to the smartphone of the genuine user; and thus the server of Example-Bank determines that it is more likely that this log-in attempt is fraudulent, and triggers one or more fraud mitigation operations (e.g., requiring the end-user to call customer service; presenting additional security questions; sending a one-time password via an email message to an email address of the genuine user; or the like).

Other fraud-prevention and fraud-mitigation scenarios, as well as user authentication and user verification scenarios, may be handled by various embodiments, as detailed herein.

Some embodiments may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME DEMONSTRATIVE EMBODIMENTS

The Applicants have realized that a Push notification may be sent to a smartphone or a user, via a mobile application or "app" that the user has installed; and that such Push notification can be configured to trigger the smartphone to silently provide its IP address to the remote server that sent it the Push notification; and that such remote server can then utilize the IP address of the smartphone as an assistive tool to authenticate a user that attempts to log-in to that server or to a computerized service that is associated with that server.

For example, a Mobile App Push Notification is a message sent by an application to a customer's mobile device. This message can be either visible or invisible. App publishers can push a notification to the user's mobile device at any time, particularly to customers who have installed the mobile app and have opted-in to receive messages or push notifications upon installation (or subsequently through a Settings menu or a User Profile page). Push notifications are typically used to deliver product updates, limited-time promotions, information updates, and/or other information that is integral to (or related to) the functionality of the application or to the service that the application provides to the end-user. For example, a Push Notification in an email reader mobile application may indicate to the user that a new email message has arrived; a Push Notification in a mobile application of a coffeeshop may indicate to the user that a limited-time promotion is available; and so forth.

Some embodiments may utilize mobile app Push Notifications to trigger the app to collect information from the user's mobile device when the user logs in (or, immediately after or shortly after the user logs in) to his/her account (e.g., a banking website, a retailer website, an account that is accessible via a mobile app or the like), and by that to perform cross-channel verification or cross-channel authentication, in order to ensure that the log-in attempt was performed by the genuine/legitimate user (and not by an attacker/impostor).

Some embodiments may provide, for example, a method of seamlessly and/or transparently and/or silently verifying the proximity or relative proximity between (i) a user who interacts with a computerized service via an unverified electronic device, and (ii) a verified mobile device which is known to be generally located in proximity to the user, based on the determination that the two entities (e.g., a verified device such as a smartphone, and a non-verified device such as a laptop or desktop computer) have the same IP address. The method may include, for example: (a) Collecting or extracting or obtaining the IP address of an unverified desktop or mobile device that is claimed to be used by the user (e.g., during or in a log-in session); (b) sending a mobile app Push Notification to a verified mobile device that is known to be associated with that user and that is known to be located generally in proximity to the user (e.g., a smartphone of the genuine user); the push notification seamlessly or silently or invisibly triggers the verified mobile device to send or convey or share its current IP address with a remote server (e.g., the remote server that sent it the Push Notification, or another pre-defined remote server that is associated with that mobile app or that serves data to that mobile app or that is configured to receive data from that mobile app); (c) comparing between (I) the IP address of the verified device, and (II) the IP address of the unverified device, and based on such comparison, determining whether the two devices are accessing the network using the same IP address. Optionally, the method further includes: (d) based on the determining of step (c), determining that the unverified device is being accessed in proximity to the location of the verified mobile device of the genuine user; and thus, determining that it is more likely that the unverified device is being used by the genuine user, and not by a remote attacker/impostor that is physically located remotely from the verified mobile device of the genuine user. It is noted that in some scenarios, it is possible that two devices will have the same IP address, even if they are not necessarily operated by or carried by the same human user; however, it is also noted that the Applicants have realized that for purposes of triggering a possible-fraud alert and for prevention of some (and not necessarily all) cyber-attacks, it can be beneficial and advantageous to take into account a determination of whether or not the two devices report the same IP address; and to raise a possible-fraud alert and/or to trigger fraud-prevention operations if the two devices do not report the same IP address. It is noted that in the field of cyber-security, protection of 100 percent against attacks or against fraud or against compromising attempts is rarely obtained; and in this specific field, a cyber-security system that successfully prevents 80 or 90 or 95 percent of fraud attempts, by utilizing a particular fraud detection method, is useful and provides utility to the relevant entity (e.g., a bank, a financial institution, an online merchant); and it is also noted that the remaining scenarios, in which a "false positive" error may occur or a "false negative" error may occur, may be covered by other fraud-prevention techniques that may be employed in parallel or in series.

In a demonstrative scenario in accordance with some embodiments, John is a customer of Example Bank. John has the bank's Mobile App installed on his smartphone. Upon installation, the bank links between (i) John's smartphone and (ii) John's bank account number (or John's record at the bank); for example, using a unique identifier of the Mobile App that is installed on John's smartphone and that is unique per smartphone. A few weeks after installation of the Mobile App on his smartphone, John uses a laptop computer to log in to his bank account, for the first time ever via that laptop computer; namely, John has never accessed the banking website via that laptop. The bank's server collects or extracts or obtains the IP address of the laptop computer of John; for example, using HTTP or HTTPS header data that the browser on that laptop provides. The bank's server would like to verify that it is indeed John, the genuine/legitimate user, trying to log in via the laptop, rather than an attacker or impostor; and therefore, the bank's server sends a Push Notification to John's smartphone, and by that retrieves the current IP address of John's smartphone. The bank's server then compares between the two IP addresses; if the two IP addresses are identical to each other, then this may indicate to the bank that the user who logged-in via the laptop computer is indeed the genuine user John; whereas, if the two IP addresses are different, then this by itself may indicate to the bank that the user who logged-in via the laptop computer is possibly an attacker/an impostor, and this may suffice for the bank to deny access to the account via the laptop until the genuine user performs additional fraud-mitigation steps (e.g., call customer service; provide a one-time password that is sent via email or SMS text message; answer security questions; or the like). In some embodiments, optionally, the bank's server verifies that John is indeed in proximity to the laptop computer that was used to access his bank account. Accordingly, the bank's sever is actually using two authentication methods: (I) first, John could log in only because he knows his credentials (that is "something that the user knows", and (II) second, John could log in only because his laptop computer could be authenticated thanks to the laptop's physical proximity to another authenticated device (that is "something that the user has"). This second authentication means is generally similar in its result to a secondary authentication means via a one-time password (typically sent to an authenticated phone by SMS), but it is (i) safer, because the user needs to be in the same location, and also (ii) more user friendly, because the user in not requested to do anything actively, and also (iii) faster, because the user does not need to open an SMS message and copy a code from it to his laptop, and also (iv) more efficient and less error-prone, since it does not require the user to manually type a one-time password (which is a manual task that the user may fail due to a typing error or a reading error).

In some embodiments, optionally,

In some embodiments, optionally, the Push Notification can trigger the Mobile App to send an "on-call" status. This will let the server of the service provider (e.g., bank) know whether the user is currently using the smartphone when logging in to his account. This can be used as an indication for the service provider that the user is being scammed.

In some embodiments, optionally, the Push Notification can trigger the Mobile App to send to the server one or more accelerometer events or accelerometer data, or data sensed by an accelerometer or gyroscope or compass units or device-orientation sensor of the smartphone. If the unverified device, which also collects accelerometer events or such device-orientation data, is actually the verified user's smartphone, accessed through the mobile browser on the smartphone, then the accelerometer events (or other sensed data) collected through both channels would be identical, and the access through mobile browser will be considered safe and genuine and not attack-related.

Optionally, some embodiments may further handle or detect situations that involve theft or loss of the smartphone. For example, in some embodiments, the Push Notification by the Mobile App is triggered or performed periodically, and collects the exact geo-location of the mobile device every T hours (or every T minutes), and stores the geo-location coordinates (e.g., locally on the smartphone itself). Every login to the Mobile App on that smartphone, will trigger an active comparison between (i) the current geolocation coordinates of the smartphone, and (ii) previous geolocation coordinates of that smartphone; and enable calculating the minimal distance between the current location and each previous location. If the current login is identified as being performed at a location that is at least D kilometers away from the nearest previous location of the smartphone, then the system may determine that the smartphone is more probably not being held by its genuine user/owner, due to a possible theft or loss; and fraud mitigation operations may be triggered.

In some embodiments, optionally, the system may verify that the user of the smartphone (the verified device) is indeed located in physical proximity to the unverified device (e.g., the laptop computer); for example, using one or more methods for detecting whether a device (e.g., the laptop) is being used by a remote attacker via a Remote Access Trojan (RAT) or other malware; such as, using one or more RAT detection methods as described in U.S. Pat. No. 9,690,915, which is hereby incorporated by reference in its entirety.

In some embodiments, optionally, data from multiple service providers (e.g., multiple banks; multiple retailers; a combination of banks and retailers; or the like) can be aggregated to create a Consortium Dataset, which will then allow a single service provider (e.g., a bank) to authenticate a device (e.g., a laptop) that is utilized by a user even if the user does not have the Mobile App of that particular provider installed on his smartphone. For example, Example Bank may coordinate in advance with Amazing Retailer, to assist each other with regard to log-in attempts of users; User Bob logs-in to Example Bank from his laptop; the smartphone of User Bob does not have the mobile app of Example Bank installed, at all, but has the mobile app of Amazing Retailer installed; due to the cooperation between them, the server of Example Bank sends a request to the server of Amazing Retailer, to trigger a Push Notification to the smartphone of User Bob, in order to obtain the IP address of that smartphone; the IP address of the smartphone of User Bob is obtained via the Push Notification performed by the mobile app of Amazing Retailer, and is provided to the server of Example Bank, which can now compare that IP address (of the smartphone of User Bob) to the IP address of the laptop computer from which a log-in attempt was performed towards Example Bank; thereby allowing the server of Example Bank to perform a cross-channel authentication that uses a push notification via a third party's mobile app. In some embodiments, user consent may be pre-obtained for such cross-channel authentications, and/or for sharing of IP address data that is obtained via push notifications; and many users may consent to such information sharing if it is limited to the particular purpose of enhancing their security and detecting fraudulent attacks on their accounts.

Some embodiments may optionally use Passive IP address collection and then utilization. For example, the service provider (e.g., Example Bank) can obtain the IP address of the unverified device (e.g., the laptop computer) even when the user does not interact directly with the computerized service of that service provider (Example Bank). For example: (a) the user purchases a product on the website of Amazing Retailer, and performs a payment by typing his credit card details into a web browser via his laptop; (b) the Credit Card issuer receives from the retailer's server the credit card information and also the IP address of the user's laptop, even though the user himself was not interacting directly with any website or server of the Credit Card issuer; (3) the user has the Mobile App of the credit card issuer, installed on his smartphone; and therefore, the Credit Card issuer sends via that Mobile App a push notification to the smartphone of the user, and obtains the smartphone's current IP address; and can verify that the payment that was submitted via another device (the laptop) towards another server (the server of Amazing Retailer) was indeed performed by the legitimate user.

In some embodiments, optionally, particularly to comply with even higher security requirements, the push notification via the mobile app can trigger a launch of a user interface that requires active response of the user, such as actively clicking on a particular on-screen button. This may increase the probability that the genuine user is fully aware of the login attempt to his account that is performed through another, unverified, device.

Some embodiments may optionally utilize asynchronous authentication, particularly for slightly lower security requirements. For example, a match between (i) the IP address of the unverified device (e.g., the laptop computer) and (ii) the IP address of the verified device (e.g., the smartphone) as obtained via a Push Notification to the Mobile App, can be utilized as sufficient for user verification or user authentication or log-in verification even if the two IP address samples were not obtained at the same time, or even if the two IP address samples were obtained within 1 or 2 or 5 or T seconds of each other. For example, if the current IP address of the verified device (e.g., the smartphone of the genuine user) is currently not available (e.g., the smartphone of the genuine user is entirely turned off), yet the IP address of the unverified device (e.g., the laptop) matches the IP address of the user's smartphone as obtained H hours prior to the log-in via the unverified device (e.g., the laptop), such as 8 or 12 or 24 hours prior, then such IP address match may be considered sufficient for authentication.

Some embodiments may optionally provide and utilize continuous cross-channel authentication. For example, the CFO of Company uses his desktop computer at 9 AM in his office to log-in (via a web browser) to the bank account of Company at Example Bank, in order to perform financial transactions for Company all day long, to monitor incoming payments from customers of Company, to perform outgoing payments to suppliers of Company, and so forth. The CFO remains logged-in, and active, on his desktop computer for several hours straight. The CFO also has the Mobile App of Example Bank installed on his smartphone, as he sometimes utilizes the Mobile App to check the balance of the bank account of Company when he is away from his desktop computer. In some embodiments, the server of Example Bank is configured such that every T minutes (e.g., every 5 or 10 or 15 minutes) it sends a Push Notification to the smartphone of the CFO, during the whole work-day; and this, in turn, enables the server of Example Bank to obtain the IP address of the smartphone of the CFO every T minutes; and enables the server of Example Bank to check whether (i) a recently-obtained IP address of the smartphone matches (ii) a recently-obtained IP address of the desktop computer (or, the one-time-obtained IP address of the desktop computer as obtained at the log-in process at 9 AM); thereby enabling the server of Example Bank to continuously cross-channel authenticate the user (the CFO) who is still logged-in through his desktop computer. For example, at 3 PM the CFO leaves the building of Company to a business meeting in a remote location, but leaves his desktop computer logged-in to the bank account; an attacker enters the office of the CFO at 3:20 PM and performs a wire transfer out of the bank account of Company, via the desktop computer and browser that is still logged-in to the bank account; at 3:20 PM, in response to the wire transfer command that was entered via the logged-in desktop computer of the CFO, the server of Example, Bank sends a Push Notification to the Mobile App on the smartphone of the CFO, and obtains from that smartphone a different IP address (e.g., an IP address of a wireless network in a building where the business meeting of the CFO takes place), which is different from the IP address that was obtained from the desktop computer at 9 AM at log-in (and/or at 3:20 PM when the wire transfer command was entered); therefore, the server of Example Bank can determine that the CFO's smartphone is now remote from the CFO's office, and can determine that this is possibly a fraudulent transaction that should be blocked or denied until further assurances are provided, or may trigger other fraud mitigation operations. This enables the server of Example Bank to continuously verify, every T minutes, that a logged-in user who logged in via a particular computer and remains logged-in and active, is indeed the same genuine user; and not, for example, an attacker or impostor who exploits a desktop computer that was negligently left logged-in.

Reference is made to FIG. 1, which is a schematic block-diagram illustration of a system 100, in accordance with some demonstrative embodiments. System 100 includes a server or a set-of-servers of a Service Provider, such as a bank, a financial institution, a securities brokerage or trading firm, a retailer, an online merchant, a Social Media/Social Network provider, an email/web-mail provider, or other provider or seller of goods and/or services, or other provider which enables an end-user to create a user-account and to securely log-in into such user-account. For demonstrative purposes and as a non-limiting example, there is shown a Bank/Retailer Server 101; which may optionally be implemented as (or, which may optionally include) two or more servers or units, such as a Web Server 102 and an Application Server or App Server 103; which may be in communication with each other, and which may further be in communication with a Database 104 that stores user-account records (e.g., user profiles, user transactions). Servers 101, 102 and 103 are also in communication with the Internet 140.

In a demonstrative example, User Alice is located in her home or in her office, which is equipped with a Wireless Home Router/Wireless Office Router 160 that provides a Wi-Fi connection to various devices of Alice, and which in turn enables such devices to connect to the Internet 140. The Wireless Home Router/Wireless Office Router 160 has a particular IP address, denoted IP Address AA (for example, "201.202.203.204").

User Alice has and operates an Unverified Device 151, such as a laptop computer or a desktop computer, which connects to the Internet via the Wireless Home Router/Wireless Office Router 160. Accordingly, the IP Address of the Unverified Device 151, which is denoted IP Address BB, is the same as IP Address AA of the Wireless Home Router/Wireless Office Router 160 while Unverified Device 151 is located within the wireless communication range of the Wireless Home Router/Wireless Office Router 160 and while Unverified Device 151 is indeed wirelessly connected to the Wireless Home Router/Wireless Office Router 160.

Verified Device 151 has a Web Browser 153, which enables User Alice to access the website of the Bank/Retailer that operates or owns the Bank/Retailer Server 101. Optionally, Verified Device 151 may have installed thereon a Dedicated/Native App 154 of the Bank/Retailer; for example, a dedicated application that User Alice downloaded from the website of the Bank/Retailer, or a dedicated application that User Alice downloaded from an App Store that caters to electronic devices such as desktop computers and laptop computers (and not necessarily for smartphones or tablets), such as the Microsoft Store which provides dedicated apps for computers running Microsoft Windows, or the Apple App Store which provides dedicated apps for Apple MacBook laptops, or the like.

User Alice further owns a Verified Device 161; for example, a smartphone on which User Alice has installed a Mobile App 164 of said Bank/Retailer. The Verified Device 161 may also have a Web Browser 163. The Verified Device 161 has an IP address, denoted IP Address CC. When Verified Device 161 is carried by User Alice on the street, or away from her home/office, Verified Device 161 connects to the Internet via its cellular transceiver and via a cellular communication network (e.g., 5G or 4G-LTE or 4G or 3G cellular network). When Verified Device 161 is inside the home/office of User Alice, Verified Device 161 automatically connects to the Wi-Fi network in that venue, by wirelessly connecting to the Wireless Home Router/Wireless Office Router 160; and in such situation, the IP Address CC of Verified Device 161 is identical to the IP Address AA of the Wireless Home Router/Wireless Office Router 160.

In a demonstrative example, User Alice utilizes the Web Browser 153 of the Unverified Device 151 (e.g., the laptop computer or desktop computer) to log-in into the Web Server 102 of Bank/Retailer. For example, User Alice browses to the website of "ExampleBank.com", clicks on "Log In", enters her username and her password, and clicks "Submit" via her Web Browser 153. Unverified Device 151 sends the credentials, securely over HTTPS or SSL-TLS, to Web Server 102 of Bank/Retailer; and there, a Log-In Module 111 of Web Server 102 checks whether these credentials match pre-stored credentials of User Alice, in order to authenticate User Alice and to allow her access to her user-account at that Bank/Retailer.

In a demonstrative example, the Log-In Module 111 of Web Server 102 determines that the credentials are correct, and thus User Alice appears to be the genuine user; however, instead of immediately allowing User Alice to access her account, Web Server 102 and/or its Log-In Module 111 initiate a cross-channel authentication process to further authenticate or to further verify the identity of User Alice.

In a demonstrative implementation of the cross-channel authentication process, the Log-In Module 111 of Web Server 102, or a particular unit or module of Web Server 102, such as an "IP Address Extractor (from Web Browser)" Unit 113, extracts or obtains the IP Address BB of the Unverified Device 151 (e.g., laptop or desktop computer). The extraction of the IP Address BB of the Unverified Device 151 may be performed in various ways, since the Unverified Device 151 advertises its own IP Address BB towards servers with whom the Unverified Device 151 communicates. For example, Web Server 102 may utilize the following PHP command, $ipaddress=getenv("REMOTE_ADDR");

or may use the following PHP command:

$ipaddress=$_SERVER['REMOTE_ADDR'];

to obtain the IP Address BB of the Unverified Device 151. Additionally or alternatively, using JavaScript or JSON, the "ipify" API (available from "ipify.org") or the "IPinfo" API (available from "ipinfo.io") may be used to obtain the IP address of the Unverified Device 151 (and also, optionally, geo-location information that corresponds to the IP address of the Unverified Device 151, as such geolocation information may further be used as part of the cross-channel authentication process, as detailed herein).

Additionally, Web Server 102 checks the Database 104 and obtains from it the particular record of User Alice. That particular record includes a Unique ID of the Smartphone of User Alice (for example, the Media Access Control (MAC) address; the International Mobile Equipment Identity (IMEI); the "ANDROID_ID" or the "Secure.ANDROID_ID" or the "Settings.Secure.ANDROID_ID or the "SSAID" parameter of an Android device), that was created when User Alice had installed the Mobile App 164 on her smartphone (Verified Device 161) and/or when User Alice had logged-in for the first-time-ever from her smartphone (Verified Device 161) towards the Bank/Retailer and/or when User Alice performed "factory reset" on her smartphone and/or when User Alice defined a new user profile on her smartphone. Based on that Unique ID, a Push Notification Sender Unit 112 of Bank/Retailer Server 101 sends a Push Notification to the Mobile App 164 of the particular Verified Device 161 (e.g., smartphone) of User Alice.

In response to the Push Notification, the Verified Device 161 (e.g., smartphone) of User Alice provides to App Server 103 the current IP Address CC of the Verified Device 161 (e.g., smartphone) of User Alice; or, a particular unit or module of App Server 103, such as an "IP Address Extractor from Push Notification Response" Unit 114, extracts or obtains the IP Address CC of the Verified Device 161 (e.g., smartphone) of User Alice. In some embodiments, the Push Notification—similarly to the manner in which it can trigger the app to download an update—is configured to trigger the app to send data to the server (e.g., a trusted server of the protected entity, such as the bank or online merchant; or a trusted server of a trusted third-party that provides cyber-security services or solutions); and such "data" can be or can include any information that the app is permitted to collect, yet in some embodiments the "data" sent is at least the IP address of the device, and optionally also an "on-call indication" and/or sensor(s) data (e.g., spatial orientation sensor data, accelerometer data, gyroscope data, compass unit data).

Then, an IP Address Comparing and Analysis Unit 115 operates to compare or analyze the two IP addresses that were obtained, namely: (i) the IP Address CC that was obtained from the Verified Device 161 of User Alice (e.g., her smartphone) via the Push Notification to the Mobile App 164, and (ii) the IP address BB that was obtained from the Unverified Device 151 (e.g., her laptop or desktop computer).

If the IP Address BB is identical to the IP Address CC, then a User Authentication Module 119 of Bank/Retailer Server 101 determines that it is more likely that the user who has just logged-in via the Web Browser 153 on the Unverified Device 151, is indeed the genuine/legitimate user (namely, User Alice, and not an attacker/impostor); and the User Authentication Module 119 of Bank/Retailer Server 101 proceeds to authorize and enable the access of Unverified Device 151 to the user-account of User Alice.

In contrast, if the IP Address BB is not identical to the IP Address CC, then the User Authentication Module 119 of Bank/Retailer Server 101 determines that it is not certain that the user who has just logged-in via the Web Browser 153 on the Unverified Device 151 is indeed the genuine/legitimate user, or determines that there is a reasonable probability that the log-in via the Web Browser 153 on the Unverified Device 151 was performed by an attacker/impostor; and the User Authentication Module 119 of Bank/Retailer Server 101 proceeds to un-authorize and to block or deny the access of Unverified Device 151 to the user-account of User Alice, and/or the User Authentication Module 119 triggers a Fraud Mitigation Operations Unit 118 to initiate or to perform one or more pre-defined fraud-mitigation operations, such as: e.g., requiring the user of the Unverified Device 151 to answer pre-defined security questions; requiring the user of the Unverified Device 151 to enter a one-time code that is sent via an SMS message to the phone number associated with that user-account; requiring the user of the Unverified Device 151 to enter a one-time code that is sent via an email message to the email address that is associated with that user-account; requiring the user of the Unverified Device 151 to contact a Customer Support Representative via a telephone call; or the like.

In some embodiments, the values of IP Address BB and IP Address CC are stored by Bank/Retailer in a IP Address Dataset Per User 117, in order to allow re-utilization of IP Addresses, particularly of IP Address CC, for user authentication purposes. For example, User Alice has completed successfully her log-in process with cross-channel authentication at 9:00 AM, and then logged-out at 9:05 AM from her account via the Web Browser 153 on her Unverified Device 151 (e.g., her laptop). Later, at 9:10 AM, the battery of the smartphone of User Alice becomes completely depleted, and her smartphone is thus turned-off and non-operational. Then, at 9:15 AM, User Alice again logs-in to her account via the Web Browser 153 on her Unverified Device 151 (e.g., her laptop). A Push Notification to her smartphone at 9:15 AM fails, or does not produce any response, or does not trigger the smartphone to provide its current IP Address BB, since the smartphone is entirely turned-off. In such situation, optionally, the system may be configured to allow the User Authentication Module 119 of Bank/Retailer Server 101 to inspect or to search the IP Address Dataset Per User 117; to find in that Dataset an indication of the value of IP Address CC that was collected via a Push Notification at 9:00 AM; to determine that this sampling of IP Address CC is "sufficiently fresh" for user authentication purposes since it was collected only 15 minutes ago (e.g., it is below a pre-defined Freshness Threshold Value that may be configured by the administrator of Server 101); and to determine that the match between (i) the current value of IP Address BB that was collected from the laptop at 9:15 AM, and (ii) the most-recent value of IP Address CC that was obtained via a Push Notification from the smartphone at 9:00 AM, is sufficient to enable access of the laptop's user to the user-account to which it logged-in.

In some embodiments, optionally, a Push Notification Timing Unit 116 may be configured to periodically trigger the Push Notification Sender 112 to send a Push Notification to the Verified Device 161 (e.g., the smartphone) every M minutes (e.g., every 30 minutes, every 50 minutes), and/or at pseudo-random time intervals (e.g., every N minutes, wherein N is selected pseudo-randomly from the range of 25 to 45 minutes); in order to allow the system to provide "continuous authentication" to a logged-in user, and/or to detect a situation such as a "coffee break attack" (e.g., a logged-in user left his desktop computer logged in, and exited the office for a short break, and an attacker on the premises exploits the logged-in desktop computer).

In some embodiments, the Verified Device 161 (e.g., a smartphone) is equipped with: one or more Accelerometer(s) 165; one or more Gyroscope(s) 166; one or more Compass Unit(s) 167; and/or one or more Device-Orientation Sensor(s) 168. Data from such units or sensors may be utilized as part of the cross-channel authentication process. In a demonstrative example, User Alice is not utilizing her laptop/desktop computer at all; but rather, she utilizes the Web Browser 163 on her smartphone to browse to "ExampleBank.com" and to log-in into it via her Web Browser 163; for example, since User Alice forgot that she had installed the Mobile App 164 of Example Bank on her smartphone; or, since User Alice simply prefers to perform the access via the Web Browser 164 and not via the Mobile App 164. In such situation, the Push Notification to the smartphone may be configured to cause also extraction—via the Mobile App 164—of device-orientation/device-motion data; and similarly, the Web Browser may also be triggered via a suitable JavaScript event (e.g., DeviceOrientation Event, DeviceMotion Event) or via other Document Object Model (DOM) element to obtain device-orientation/device-motion data. If it is determined that (i) the device-orientation/device-motion data obtained from the Push Notification via the Mobile App 164, is identical to (ii) the device-orientation/device-motion data obtained from the Web Browser 163, then the User Authentication Module 119 determines that it is more likely that it is the genuine/legitimate user who utilizes her smartphone to log-in via the Web Browser 163, on the same smartphone that also has the Mobile App 164 installed; and thus, the user access would be authorized. In contrast, if it is determined that (i) the device-orientation/device-motion data obtained from the Push Notification via the Mobile App 164, is not identical to (ii) the device-orientation/device-motion data obtained from the Web Browser 163, then the User Authentication Module 119 determines that this may be a fraudulent log-in attempt or an attack against the user-account, and the user access would be blocked or un-authorized, and fraud mitigation operations would be triggered or initiated.

The utilization of device-orientation/device-motion data may allow the system to detect and block various attacks, in which other methods may fail. For example, Villain Victor performs "shoulder surfing" or "peeking over" in a Coffeeshop, and observes User Alice as she is manually typing her credentials into her smartphone; User Alice logs-in successfully into her user-account, and after two minutes she logs out, she places her smartphone horizontally on the table, and she eats breakfast at Coffeeshop. Villain Victor uses his own smartphone, connected via the Wi-Fi network of Coffeeshop, to access the bank/retailer website via his Web Browser on his smartphone, and Villain Victor manually enters the credentials of User Alice that he stole. A Push Notification by itself, sent by Server 101 to the smartphone of User Alice, might not suffice here; because the smartphone of User Alice and the smartphone of Villain Victor may have the same IP Address, which is the IP Address of the wireless router of Coffeeshop. However, the utilization of device-orientation/device-motion data may allow Server 101 to detect and block this attack: device-orientation/device-motion is collected via a Push Notification from the Mobile App of the smartphone of User Alice, and this data shows that the smartphone of User Alice is resting (not moving) horizontally; whereas, at the same time, device-orientation/device-motion is collected via DOM/JS events from the Web Browser of the smartphone of Villain Victor, and this data shows that his smartphone is held diagonally and is slightly moving (since Villain Victor is holding his smartphone in his hand and is operating the smartphone); and this mismatch allows the User Authentication Module 119 to block the log-in attempt by the Web Browser of the smartphone of Villain Victor into the user-account of User Alice.

In some embodiments, Verified Device 161 (e.g., the smartphone of User Alice) has a GPS/Geo-Location Unit 169, which can further be used for cross-channel authentication, in combination with one or more other methods or features that are described above and/or herein. For example, system 100 may be configured such that every M minutes (e.g., every 15 or 30 minutes; or every N minutes wherein N is pseudo-randomly selected from the range of 20 to 40), a Push Notification is sent to the Verified Device 161 (e.g., the smartphone of User Alice), and triggers an extraction (via the Mobile App 164) of the current GPS data/geo-location data of that Verified Device 161 (e.g., the smartphone of User Alice); and such GPS data/geo-location data is logged and stored by Server 101. A new log-in attempt towards Server 101 would trigger a check for the current, fresh, geo-location data of the smartphone; and if the current/fresh geo-location is distant by more than P kilometers from any previously-obtained geo-location data of the smartphone (e.g., previously-obtained within the past H hours or D days; such as, in the past 24 hours, or in the past 5 days), then the current log-in attempt may be blocked as un-authorized or as possibly-fraudulent, and/or fraud mitigation operations may be initiated. It is noted that this process is not merely a conventional process in which a web server relies on previously-recorded geo-location data that was obtained from IP addresses collected a Web Browser of the user, or that were obtained from a Native App/Mobile App on a smartphone; but rather, this authentication process innovatively utilizes geo-location data that was obtained from Push Notifications that were sent to the Mobile App of the bank/retailer and particular (fixed, or pseudo-randomly selected) time intervals, to establish a list of previous geo-location data-points that do not necessarily correspond to time-points in which an active log-in process was performed. Conventional systems that rely on previous IP address or previous geo-location data (that is inferred from IP addresses), do Not utilize periodical sending of Push Notifications to a Mobile App of a smartphone for the particular purpose of collecting geo-location data in response to such Push Notifications and for subsequent use of such collected geo-location data for user authentication at log-in.

In some embodiments, Server 101 may include, or may operate in conjunction with, a Remote Access Trojan (RAT) Detector 120, which is configured to actively and/or passively detect Remote Access to the Unverified Device 151; in order to ensure that the Unverified Device 151 is indeed utilized locally by a human user that is located physically in immediately proximity to Unverified Device 151, and to ensure that Unverified Device 151 is not operated by a remote attacker (e.g., remote human attacker, or remote machine-based attack module) that operates the Unverified Device 151 remotely via a Remote Access malware or Trojan.

In some embodiments, if the IP address of the Verified Device 161 (e.g., the smartphone) is not identical to the IP address of the Unverified Device 151 (e.g., the computer), then the system may detect and may take into account, for fraud detection purposes, whether or not the two devices are currently "exposed" to the same Wi-Fi network (e.g., having the same Service Set Identifier or SSID), or whether the two devices recognize as available the same Wi-Fi network having the same SSID; even if one of the devices is not actually connected to that particular Wi-Fi network; or, in some implementations, even if both of those devices are not connected to that particular Wi-Fi network.

In a demonstrative method, the following steps may be performed: (A) determining that the computer is in a Wi-Fi range of a particular Wi-Fi network having a particular Service Set Identifier (SSID); (B) in response to said Push Notification to said smartphone, determining that the smartphone, even if not connected to said particular Wi-Fi network, is within the Wi-Fi range of said particular Wi-Fi network having said particular SSID; (C) based cumulatively on the determining of step (A) and the determining of step (B), further determining that said computer is more-probably utilized by a legitimate user and not by an attacker.

In another demonstrative example, User Adam utilizes his laptop computer to access the banking website via his home Wi-Fi network, having the SSID "Hot-and-Spicy-24-7". The server sends a Push Notification to the smartphone of User Adam, which has the banking app installed; however, the smartphone is not connected to any Wi-Fi network, and is only connected to the 5G or 4G cellular network in the area. The smartphone receives the Push Notification, which triggers the banking app to send back a list of SSID strings that are currently available to the Wi-Fi transceiver of the smartphone. The server detects, from the response to the Push Notification, that the smartphone recognizes the SSID "Hot-and-Spicy-24-7" as available within Wi-Fi range of the smartphone. The server utilizes this match to support a determination that the computer was utilized by a legitimate user and not by an attacker. In contrast, if the list of SSID strings that the smartphone senses (and returns to the server in response to the Push Notification) does not include the SSID "Hot-and-Spicy-24-7", then the server may utilize this lack of matching to support an estimate that the computer is more-probably utilized by an attacker and not by the genuine/legitimate user.

In some embodiments, optionally, the verified device and the unverified device are both mobile/portable devices, that are capable of detecting and reporting (explicitly, and/or via a response to a dedicated Push Notification sent to them) the SSID or other Wi-Fi network identifier that they recognize or find, or that they are within its reach or reception range, or that they are connected to; and such data may be collected by the server (e.g., of the bank or the online retailer, or of a trusted third-party or a trusted entity that provides cyber security services or fraud detection services to such bank or online retailer or to other service provider), and may be compared or matched in order to estimate whether the two devices are currently connected to the same Wi-Fi network; or, whether the two devices are currently within the range of the same Wi-Fi network; or, whether one device is connected to a particular Wi-Fi network that is also currently within the Wi-Fi range or reach of the other device (which is not necessarily connected to that same Wi-Fi network, but still reports it as being within its Wi-Fi reception range). A match may be used by the server to support a determination that the log-in attempt is legitimate; whereas, absence of a match may be used by the server the server to support a determination that the log-in attempt is possibly-fraudulent or possibly illegitimate.

In some embodiments, optionally, the server may collect or extract or obtain or utilize at least (or: only) the Autonomous System Number (ASN) of a particular device, such as a 16-bit ASN or a 32-bit ASN, or the "IP prefix" portion of the full IP address of the device; and may utilize the ASN value as a factor for supporting a decision that the log-in attempt is legitimate (or, is illegitimate). For example, User Carla is an employee of the retailer Walmart; she uses a web browser on her desktop computer within a Walmart store to access her own bank account at Example-Bank, during her work recess; the desktop computer is connected to the private Wi-Fi network of the Walmart store, having SSID of "Walmart-Employees"; and the web browser of that desktop computer reports its IP address (via an HTTP header) to the server, as IP address "63.79.88.0". The server of Example-Bank sends a Push Notification to the smartphone of Carla; which is located near her, on a desk; and which is currently connected to a different Wi-Fi router and/or a different Wi-Fi network or SSID, such as "Walmart-Guests"; and the Push Notification triggers the smartphone of Carla to provide to the server the IP address of the smartphone, which is "63.79.91.0" and is different from the IP address of the desktop computer on which Carla performed the log-in via a web browser. However, the server of Example-Bank can utilize a propriety database or public database, or may utilize contextual analysis or string comparison analysis, to determine or to estimate that the two IP addresses—even if not identical—do still belong to the same organizational network. In some embodiments, for example, the server may detect that the ASN or the IP prefix "63.79" is identical, and may lookup in a database (private or proprietary or public database) to find out that they belong to the same organization. For example, a publicly-available database such as "BigDataCloud.com" shows that ASN "AS-32851" belongs to "Walmart Stores Inc.", and includes therein both of the above-mentioned IP addresses; and such data is publicly available to the server, from: <bigdatacloud.com/asn-lookup/AS32851> or from other suitable ASN database or IP-ranges database. In another example, the server may obtain the IP address of the desktop computer (via its browser, based on the HTTP header); may then perform a reverse search via a suitable database, that correlates the IP address of "63.79.88.0" to Walmart corporation; and the server may obtain from the smartphone of Carla, in response to a Push Notification, the information that the smartphone is connected to the SSID "Walmart-Guests" or is within the Wi-Fi range of that SSID; and the server may perform a contextual analysis or a string comparison to determine that both of the two devices (the desktop computer and the smartphone) are connected to—or are at least within the range of—one or more Wi-Fi network(s) of a Walmart store (or of the Walmart corporation); and this determination may support the decision that the log-in attempt is legitimate.

In some embodiments, the system may utilize SSID extraction or SSID determination or SSID detection, of one or more devices that are operated by the end-user and/or of one or more devices that are known to be associated with (or held by, or owned by, or controlled by) the end-user; as well as contextual analysis or string analysis or substring analysis of such SSID values, in order to perform cross-channel authentication. For example, a method may include: (a) determining that a log-in attempt is performed via (or submitted via) a first electronic device that is connected to a particular Wi-Fi network having a first SSID string (e.g., "Walmart-Employees"); and, (b) sending a Push Notification to a second electronic device that is known to be associated with said end-user, and thus triggering the second electronic device to send back to the server data indicating which Wi-Fi network the second device is connected to, having a second SSID string. In some embodiments, if the two SSID strings are identical (e.g., the second device is also connected to "Walmart-Employees"), then this is used by the server to support a decision that the log-in attempt via the first device is legitimate. In some embodiments, a contextual analysis or a substring analysis may be performed; for example, the server may detect that the SSID reported by the first electronic device is "Walmart-Employees", and the SSID reported by the second electronic device is "Walmart-Guests"; the first 7 or 8 characters of the substring are the same (and in this case, they also match a name of a publicly-known organization or a generally-trusted organization), and based on the match of the substring "Walmart" in the two SSID strings, the server may utilize this information to support a decision that the log-in attempt via the first device is legitimate. In contrast, if the first electronic device reports an SSID of "Starbucks-Guests", and the Push Notification to the second electronic device triggers the second electronic device to report an SSID of "Walmart-Employees", then this mismatch may support a decision by the server that the log-in attempt via the first device is not legitimate.

In some embodiments, the analysis or comparison may be performed on two SSID values or strings; wherein the SSID obtained from the first device is the SSID of the Wi-Fi network to which the first device is actually connected; and wherein the SSID obtained from the second device is the SSID of the Wi-Fi network to which the second device is actually connected. In other embodiments, the analysis or comparison may be performed on two SSID values or strings; wherein the SSID obtained from the first device is the SSID of the Wi-Fi network to which the first device is actually connected; and wherein the SSID obtained from the second device is an SSID of a Wi-Fi network to which the second device is not actually connected but that the second device is located within its Wi-Fi reception range. In other embodiments, the analysis or comparison may be performed on two SSID values or strings; wherein the SSID obtained from the second device is the SSID of the Wi-Fi network to which the second device is actually connected; and wherein the SSID obtained from the first device is an SSID of a Wi-Fi network to which the first device is not actually connected but that the first device is located within its Wi-Fi reception range. In other embodiments, the analysis or comparison may be performed on two SSID values or strings; wherein the SSID obtained from the first device is an SSID of a Wi-Fi network to which the first device is not actually connected but that the first device is located within its Wi-Fi reception range; wherein the SSID obtained from the second device is an SSID of a Wi-Fi network to which the second device is not actually connected but that the second device is located within its Wi-Fi reception range.

In some embodiments, the system may perform a comparison or a matching between: (i) a string or a substring of an SSID of the first device; and (ii) a string or a substring that is obtained by a reverse-lookup of the IP address of the second device, even without knowing or extracting the SSID to which the second device is connected. For example, the first device is connected to a Wi-Fi network having the SSID string "Walmart-Guests"; the second device reveals to the server, in response to a Push Notification, that the second device is currently connected to a network or a router having an IP address of "63.79.91.0"; the server performs a reverse lookup via a database, and determines that the range of IP addresses that begin with "63.79" belong to "Walmart Stores Inc."; and the server detects a match of the substring "Walmart" that appears in these two strings (the "Walmart-Guests" SSID string of the first device; and the "Walmart Stores Inc." that appears in the ownership record of the range of IP addresses that the second device reported one IP address from that range); and such match may support a decision that the login attempt via the first device is legitimate. In other embodiments, the situation has opposite facts: the match is found between (i) the reverse lookup of the IP address obtained from the first device, and (ii) the SSID string obtained from the second device; and such match or partial match may support a decision that the login attempt via the first device is legitimate.

In some embodiments, optionally, Web Server 102 may be owned and/or operated by a first entity (e.g., a Retailer); whereas App Server 103 may be owned and/or operated by a second, different, entity (e.g., a Bank), who also operates the Mobile App 164; and the two entities may have a cooperation agreement (e.g., also supported by user consent to such cooperation) that enables them to share or exchange particular information and/or to cooperate in order to perform cross-channel authentication of a particular user for the benefit of one of the two entities. For example, even though it is the Bank who has the Mobile App installed on the smartphone of User Alice, the cooperation between the Bank and the Retailer may enable the Web Server of the Retailer to receive an incoming set of credentials that are entered via a Web Browser on a laptop computer; to determine that the log-in is performed towards the user-account of User Alice at the Retailer; to send a request from the Web Server of Retailer to the App Server of Bank, requesting that a Push Notification would be sent to the Mobile App of the Bank on the smartphone of User Alice; thereby enabling comparison between (i) the IP Address BB obtained by the Web Server of Retailer from the Web Browser of the laptop, and (ii) the IP Address CC obtained by the Push Notification that Bank sent to the Mobile App (of the Bank) on the smartphone; thus enabling the Retailer to perform cross-channel authentication by temporarily utilizing a cooperating Mobile App of another entity for freshly collecting the IP Address BB of the smartphone. In another scenario, the Web Server may be a web server of a Retailer or a Bank, whereas the App Server may be of a credit card company; and the IP address BB, that was collected by the Web Server, may be transferred to the App Server of the credit card company, which in turn can utilize its own Mobile App to send a Push Notification to the user and to extract a fresh sample of its IP Address CC, in order to check whether or not it is identical to the IP Address BB that was provided by the Web Server of the Retailer/Bank. Other suitable scenarios may be used.

In some embodiments, the system may utilize a Push Notification to a mobile device a of a user, in order to perform cross-authentication of that particular user as he performs a transaction with a payment method or payment card or credit card or debit card at a Point-Of-Sale (POS) terminal or cash register or checkout register of a retailer. For example, User Dan visits a Target retailer store, picks up a few items, and goes to a checkout line with a human cashier (or at a self-checkout station) to pay for them. User Dan utilizes his American Express credit card to pay the total amount, via a POS terminal that collects payments via credit cards. The store (Target) sends the transaction data to the server of American Express for processing; indicating that User Dan is purchasing merchandise for the amount of 45 dollars at a Target Store in Miami. The server of American Express knows that User Dan—who is a member of the American Express credit card program—had installed the American Express mobile app on his smartphone. The server of American Express sends a Push Notification to the smartphone of Dan, which is carried by Dan; and the Push Notification triggers the smartphone to send back to the server of American Express the SSID of the Wi-Fi network "Target-Guests" to which the smartphone is now connected and/or that the smartphone recognizes within its Wi-Fi range (even if the smartphone is not connected to that Wi-Fi network). The server of American Express detects that the transaction that it received from the POS terminal is a transaction at a Target store; and the server of American Express further determines that the smartphone of that purchaser is currently located within Wi-Fi range of a Target store (e.g., based on contextual analysis or sub-string comparison of the SSID); and the server of American Express may utilize this information to support a decision that the purchaser is the legitimate owner/holder of the American Express card, and not (for example) an attacker that found the lost American Express card elsewhere and went into a Target store to use it fraudulently. In contrast, if the Push Notification does not trigger a report by the smartphone that it is within the range of a Target store's Wi-Fi network or SSID, or, if the Push Notification causes the smartphone to report that it is actually connected now to a Wi-Fi network with SSID of "Walmart-Guests", then the server of American Express may utilize this information to support a decision that the purchaser is not the legitimate owner/holder of the American Express card, or that the transaction at the POS Terminal is more-probably a fraudulent transaction that should be denied or blocked, or that should trigger a requirement from the POS operator to see a driver license or photo-ID of the purchaser.

Some embodiments may thus provide a method that includes: (a) receiving transaction information, or credit card/debit card/payment card information, from a Point Of Sale (POS) terminal in a retail store; wherein the transaction information indicates at least the name of the purchaser (or a unique identifier or token associated with the purchaser, such as the full number of his payment card) and the name of the retail store; (b) determining that this particular purchaser has installed a particular mobile app on his smartphone (or other verified device); and seceding a Push Notification to that smartphone, thereby triggering that smartphone to respond with its current IP address and/or with the SSID string of the Wi-Fi network to which it is connected and/or with the SSID strings of Wi-Fi networks that are within its Wi-Fi reception range. Then, the method performs at least one of: (c1) determining whether the SSID string that the smartphone provided to the server, such as "Target-Guests", yields at least a partial match (e.g., of at least N consecutive characters, wherein N is a pre-defined threshold value) with the name of the retail store (such as "Target Superstore") as submitted to the server as part of POS terminal transaction data; and utilizing such partial match to support a decision that the purchase transaction that is now submitted via the POS terminal is legitimate; or, in some embodiments, performing: (c2) determining whether a reverse lookup of the IP address that the smartphone provided to the server, is an IP address that is known to be owned by a particular organization such as "Target Stores"; and finding at least a partial match (e.g., of at least N consecutive characters, wherein N is a pre-defined threshold value) between (I) the reverse-lookup ownership data of the IP address that the smartphone reported back to the server in response to the Push Notification, and (I) the name of the retail store (such as "Target Superstore") as submitted to the server as part of POS terminal transaction data; and utilizing such partial match to support a decision that the purchase transaction that is now submitted via the POS terminal is legitimate.

In some embodiments, optionally, the Push Notification that is sent to the Mobile App 164 may be "silent" or "invisible" to the user or "transparent" to the user, such that the user of the Verified Device 161 (e.g., the smartphone) is not even aware that a Push Notification has been sent to his Mobile App and/or was utilized for cross-channel authentication. In other embodiments, optionally, the Push Notification that is sent to Mobile App 164 may be non-silent or visible or non-transparent, and may even require the user to perform a talk on her Verified Device 161 (e.g., to tap or click an on-screen button on her smartphone), in order to ensure that the user of the Verified Device 161 is fully aware that a log-in process is being performed towards her user-account.

It is clarified that in accordance with some embodiments, the Push Notification is not a "one time password" message, and is not a "one time code" message, and does not carry therein any particular string or code or number that the user (e.g., of the smartphone) needs to then copy-and-paste or type into an input field or a form or a website.

It is clarified that in accordance with some embodiments, the Push Notification is not an SMS message; since such SMS message does not have the capability to automatically force the smartphone to respond to it and to expose its current IP address.

It is clarified that in accordance with some embodiments, the Push Notification is not a request for the user to solve a CAPTCHA or to perform an additional task or log-in task; rather, it is a Push Notification that is pushed to the Mobile App on the smartphone of the user, and it forces the smartphone to respond to it or to react to it in a manner that exposes the current IP address of the smartphone.

In some embodiments, optionally, the Push Notification to the Verified Device 161 (e.g., the smartphone) triggers the Verified Device 161 to respond with a message or a signal indicating that it is "on call", namely, that this Verified Device 161 (e.g., this smartphone) that has just received the Push Notification is currently engaged in a voice call. If an "on call" signal is received at Server 101 in response to a Push Notification, then this may be used by User Authentication Module 119 as a "red flag" that supports a possible-fraud determination (by itself, or with other fraud flags or fraud characteristics, such as initiation of a wire transfer to a new payee, or shipping of a purchased product to a new shipping address); since, in some situations, the fact that the smartphone reports that it is "on call" during the log-in process (that is performed in parallel via a computer) may indicate that the user is being scammed, or that the user is following fraudulent orders that are conveyed to him telephonically by an impostor/attacker.

In accordance with some embodiments, the sending of the Push Notification from the trusted server to the app on the verified device, can be implemented in various ways. In a demonstrative and non-limiting example, the Server may use the Firebase API or the "Firebase Cloud Messaging" or "Firebase Cloud Messaging HTTP protocol", available from: <https://firebase.google.com/docs/cloud-messaging/http-server-ref>. In some embodiments, a token is attached to this request, in order to identify the particular end-user device. Once the client-side application or its mobile SDK receive the Push Notification, the client-side application or its mobile SDK call a pre-defined service, which may be referred to as "silentValidation pushInfo service". The server can retrieve or extract the IP address of the end-user device, from the header of the HTTP request (e.g., from the "X-Forwarded-For" field of the HTTP header, or the XFF field).

In a demonstrative example, the following pseudo-code can be used:

| Pseudo-Code 1 |
| --- |
| Endpoint SilentValidation: |
| "/notifier/pushEnroll"        // The smartphone sends the token, |
|                                                    // in order to identify the smartphone |
| "/silent_push/pushTrigger"    // This URL or function is called by the server, |
|                                                      // in order to send the Push Notification. |
| "/silent_push/pushInfo"       // This URL or function is called by the smartphone |
|                                                      // immediately upon receiving the Push Notification. |

In a demonstrative example, the following pseudo-code can be used as part of a mobile app (e.g., smartphone app) running on Android:

Pseudo-Code 2A

```
private suspend fun sendPushInfo(messageId: String?): Boolean =
suspendCoroutine { continuation ->
    val mId = messageId ?: "unknown message id"
    val pushBody = PushInfoBody(customer.customerId,
    customer.sessionId, getMuId( ),
        wifiHelper.obtainIPAddress( ), callHelper.isOnCall( ), mId, latitude,
longitude, accelerometer_data)
    val request = remoteService.sendPushInfo(pushBody.cid,
pushBody.csid, pushBody.muId, pushBody.internalIP,
        pushBody.isCallDetected, pushBody.messageId, pushBody.latitude,
        pushBody.longitude)
```

In a non-limiting demonstrative example, the following pseudo-code can be used as part of a mobile app (e.g., smartphone app) running on Android, as an additional pseudo-code that follows Pseudo-Code 2A mentioned above:

Pseudo-Code 2B

```
request.enqueue(object: Callback<ResponseBody>{
    override fun onResponse(
        call: Call<ResponseBody>,
        response: Response<ResponseBody>
    ) {
        val code = response.code( )
        val success = if(code in 200..299){
            true
        }
        else{
            false
        }
        continuation.resume(success)
    }
    override fun onFailure(
        call: Call<ResponseBody>,
        t: Throwable) {
            continuation.resume(false)
    }
})
}
```

In accordance with some embodiments, and as a non-limiting demonstrative example, the following pseudo-code can be used as part of a mobile app (e.g., smartphone app) running on iOS:

Pseudo-Code 3

```
func sendPushInfoRequest(_ userData: [AnyHashable : Any]){
    tasksHelper.startBackgroundTask(self.application ??
    UIApplication.shared)
    pushInfoModel.parsePushParams(userData, muid:
enrollModel.muid,sensor:accelerometer_data)
    let requestURL = baseURL + pushInfo
    pushInfoModel.updateLocation(location: currentLocation)
        sendUrlRequest(.data, requestURL, params: pushInfoModel,
headers: formEncodedHeader){ (data,response,error) in
        self.handleResponse(message: "Push Info request", data: data,
response: response, error: error)
        self.tasksHelper.stopBackgroundTask(self.application ??
        UIApplication.shared)
    }
}
```

The term "genuine user" may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" may include, for example, any person who is not the "genuine user" of the device; an attacker; an intruder; a man-in-the-middle attacker; a man-in-the-browser attacker; an unauthorized user; an impersonator; an impostor; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

Some embodiments provide a method comprising: (a) receiving user log-in data or user-authentication data, that a user submits or provides to a first server via a web browser operated on a computer that is selected from the group consisting of: a laptop computer, a desktop computer; (b) determining, at said first server, that said user log-in data or user-authentication data matches credentials that were established for a particular user-account that is served by said first server; (c) determining, at said first server, an Internet Protocol (IP) address of said computer, by extracting the IP address that said computer advertises to Internet servers; (d) determining, at said first server, that said particular user-account is associated with a Mobile App that was installed on a smartphone of an account-owner of said particular user-account; (e) sending, by said first server or by a second server which is an applications server, a Push Notification to said Mobile App that was installed on the smartphone of said account-owner; and triggering the smartphone, via said Push Notification, to respond with a response that includes therein an Internet Protocol (IP) address of said smartphone; (f) if (I) the IP address of the smartphone, that was obtained in step (e) in response to said Push Notification, is different from (II) the IP address of said computer as determined in step (c) by said first server, then: determining that said computer is possibly utilized by a cyber-attacker, and initiating one or more pre-defined fraud mitigation operations.

In some embodiments, sending the Push Notification to said Mobile App on said smartphone, comprises sending a silent and user-transparent Push Notification (i) that does not cause any pop-up message to appear on said smartphone, and (ii) that does not require a user of said smartphone to respond or react, and (iii) that is invisible to the user of said smartphone.

In some embodiments, the first server is a web server that serves users that access their user-accounts via a web browser; the second server is an application server that serves users that access their user-accounts via a Mobile App; the web server triggers the application server to send said Push Notification to said smartphone upon a log-in attempt to said particular user-account.

In some embodiments, the method further comprises: if said Push Notification fails to trigger the smartphone to respond with its IP address, then: utilizing a previously-obtained IP address, that was obtained in response to a previous Push Notification to said Mobile App on said smartphone, instead of using a freshly-obtained IP address of said smartphone; wherein step (f) comprises: if (i) the IP address of said computer as determined by said first server, is not identical to (ii) any IP address of the smartphone that was obtained in the past T hours in response to a Push Notification to the Mobile App on the smartphone, then: determining that said computer is possibly utilized by a cyber-attacker and initiating one or more pre-defined fraud mitigation operations; wherein T is a pre-defined positive number.

In some embodiments, the method further comprises: if the IP address of the smartphone is not identical to the IP address of said computer as determined by said first server, then: utilizing a previously-obtained IP address, that was obtained in response to a previous Push Notification to said Mobile App on said smartphone, instead of using a freshly-obtained IP address of said smartphone; wherein step (f) comprises: if (i) the IP address of said computer as determined by said first server, is not identical to (ii) any IP address of the smartphone that was obtained in the past T hours in response to a Push Notification to the Mobile App on the smartphone, then: determining that said computer is possibly utilized by a cyber-attacker and initiating one or more pre-defined fraud mitigation operations; wherein T is a pre-defined positive number.

In some embodiments, the method further comprises: if the IP address of the smartphone is not identical to the IP address of said computer as determined by said first server, then: (A) determining that the computer is in a Wi-Fi range of a particular Wi-Fi network having a particular Service Set Identifier (SSID); and (B) in response to said Push Notification to said smartphone, determining that the smartphone, even if not connected to said particular Wi-Fi network, is within the Wi-Fi range of said particular Wi-Fi network having said particular SSID; and (C) based cumulatively on the determining of step (A) and the determining of step (B), further determining that said computer is more-probably utilized by a legitimate user and not by an attacker.

In some embodiments, the method further comprises: performing continuous cross-channel user authentication, to continuously authenticate said user that remains logged-in on said computer, by periodically sending Push Notifications to said Mobile App on said smartphone, and periodically checking that IP addresses that were extracted from responses to the Push Notifications match the IP address of said computer.

In some embodiments, the method further comprises: in response to said Push Notification, further obtaining a geo-location of said smartphone; obtaining a geo-location of said computer, by said first server; determining if the geo-location of said computer, is distant by at least N kilometers from any geo-location of said smartphone in the past D days, wherein D is a pre-defined positive number, then: determining that said computer is possibly utilized by a cyber-attacker and initiating one or more pre-defined fraud mitigation operations; wherein D is a pre-defined positive number.

In some embodiments, the method further comprises: obtaining from said smartphone, in response to said Push Notification to said Mobile App, device orientation data; detecting that said first server is accessed via a web browser running on a smartphone, and obtaining by said first server device orientation data of said smartphone using a method that does not rely on any Push Notification to any Mobile App; if (I) device orientation data of said smartphone, as obtained from said smartphone in response to said Push Notification, is different from (II) device orientation data of said smartphone as obtained from said smartphone using a method that does not rely on any Push Notification to any Mobile App, then: determining that said computer is possibly utilized by a cyber-attacker and initiating one or more pre-defined fraud mitigation operations.

In some embodiments, the method further comprises: obtaining from said smartphone, in response to said Push Notification to said Mobile App, device motion data; detecting that said first server is accessed via a web browser running on a smartphone, and obtaining by said first server device motion data of said smartphone using a method that does not rely on any Push Notification to any Mobile App; if (I) device motion data of said smartphone, as obtained from said smartphone in response to said Push Notification, is different from (II) device motion data of said smartphone as obtained from said smartphone using a method that does not rely on any Push Notification to any Mobile App, then: determining that said computer is possibly utilized by a cyber-attacker and initiating one or more pre-defined fraud mitigation operations.

In some embodiments, the method further comprises: in response to said Push Notification, receiving from said smartphone a signal indicating that said smartphone is currently being utilized in a voice call; determining that the smartphone is being utilized in a voice call in parallel to utilization of said computer for logging-in via said web browser, and determining that the log-in is possibly fraudulent, and initiating fraud mitigation operations.

In some embodiments, the first server is a server of an online retailer; the second server is a server of a financial service; and the method performs cross-channel authentication for a log-in into the user-account at said online retailer, by using a Push Notification to a Mobile App of said financial service.

In some embodiments, the first server is a server of an online retailer; the second server is a server of a financial service; and the method performs cross-channel authentication as part of a non-logged-in guest checkout process at said online retailer, and utilizes a Push Notification to a Mobile App of said financial service.

In some embodiments, optionally, steps (a) to (c) are skipped, and instead of them: the IP address of the computer is extracted directly by the second server from payment information that is submitted via said computer to said second server while the user is visiting an online venue that is not operated by said second server.

In some embodiments, the first server is a server of a financial service; the second server is a server of a retailer; and cross-channel authentication for a log-in into the user-account at said financial service, is performed by using a Push Notification to a Mobile App of said retailer.

In some embodiments, the method comprises: determining whether a current user is a genuine user or an attacker, based cumulatively on: (I) whether or not the IP address of the computer, is identical to the IP address of the smartphone as obtained from the response to the Push Notification; (II) an analysis of user interactions and device communication, that estimates whether (i) the user is located physically next to said computer or (ii) the user is a remote attacker that remotely controls said computer via a Remote Access Trojan (RAT) or other malware.

In some embodiments, the user-authentication data in step (a) comprises at least one of: a username and a password, a username and a Personal Identification Number (PIN), an email address and a password, an email address and a PIN, a scan of a fingerprint, a scan of a palm, a scan of a retina, an image of a face, a voice sample, a password-less token that identifies the user.

In some embodiments, a method comprises: (a) receiving log-in data or user-authentication data, that a user submits or provides to a first server via a web browser operated on an unverified electronic device; (b) determining, at said first server, that said log-in data or user-authentication data matches credentials that were established for a particular user-account that is served by said first server; (c) determining, at said first server, an Internet Protocol (IP) address of said unverified electronic device, by extracting the IP address that said unverified electronic device advertises to Internet servers; (d) determining, at said first server, that said particular user-account is associated with a Mobile App that was installed on a verified electronic device of an account-owner of said particular user-account; (e) sending, by said first server or by a second server which is an applications server, a Push Notification to said Mobile App that was installed on the verified electronic device of said account-owner; and triggering the verified electronic device, via said Push Notification, to respond with a response that includes therein an Internet Protocol (IP) address of said verified electronic device; (f) if (I) the IP address of the verified electronic device, that was obtained in step (e) in response to said Push Notification, is different from (II) the IP address of said unverified electronic device as determined in step (c) by said first server, then: determining that said unverified electronic device is possibly utilized by a cyber-attacker, and initiating one or more pre-defined fraud mitigation operations.

Some embodiments include a system comprising: one or more hardware processors, that are configured to execute code, and that are operably associated with one or more memory units that are configured to store code; wherein the one or more hardware processors are configured to perform a method or a process as described.

Some embodiments include a non-transitory storage medium or storage article, having stored thereon instructions that, when executed by a machine or a hardware processor, cause such machine or hardware processor to perform a method as described.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, accelerometer(s), gyroscope(s), compass unit(s), device orientation sensor(s), network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

In some embodiments, a system or an apparatus may comprise at least one processor or that is communicatively coupled to a memory unit and configured to operate execute code, wherein the at least one processor is further configured to perform the operations and/or the functionalities describes above.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
    (a) receiving user log-in data or user-authentication data, that a user submits or provides to a first server via a web browser operated on a computer that is selected from the group consisting of: a laptop computer, a desktop computer;
    (b) determining, at said first server, that said user log-in data or user-authentication data matches credentials that were established for a particular user-account that is served by said first server;
    (c) determining, at said first server, an Internet Protocol (IP) address of said computer, by extracting the IP address that said computer advertises to Internet servers;
    (d) determining, at said first server, that said particular user-account is associated with a Mobile App that was installed on a smartphone of an account-owner of said particular user-account;
    (e) sending, by said first server or by a second server which is an applications server, a Push Notification to said Mobile App that was installed on the smartphone of said account-owner; and triggering the smartphone, via said Push Notification, to respond with a response that includes therein an Internet Protocol (IP) address of said smartphone;

(f) if (I) the IP address of the smartphone, that was obtained in step (e) in response to said Push Notification, is different from (II) the IP address of said computer as determined in step (c) by said first server, then: determining that said computer is possibly utilized by a cyber-attacker, and initiating one or more pre-defined fraud mitigation operations.

2. The method of claim 1, wherein sending the Push Notification to said Mobile App on said smartphone, comprises sending a silent and user-transparent Push Notification (i) that does not cause any pop-up message to appear on said smartphone, and (ii) that does not require a user of said smartphone to respond or react, and (iii) that is invisible to the user of said smartphone.

3. The method of claim 1, wherein the first server is a web server that serves users that access their user-accounts via a web browser;

wherein the second server is an application server that serves users that access their user-accounts via a Mobile App;

wherein the web server triggers the application server to send said Push Notification to said smartphone upon a log-in attempt to said particular user-account.

4. The method of claim 1, further comprising:

if said Push Notification fails to trigger the smartphone to respond with its IP address, then:
  utilizing a previously-obtained IP address, that was obtained in response to a previous Push Notification to said Mobile App on said smartphone, instead of using a freshly-obtained IP address of said smartphone;
  wherein step (f) comprises:
  if (i) the IP address of said computer as determined by said first server, is not identical to (ii) any IP address of the smartphone that was obtained in the past T hours in response to a Push Notification to the Mobile App on the smartphone, then: determining that said computer is possibly utilized by a cyber-attacker and initiating one or more pre-defined fraud mitigation operations; wherein T is a pre-defined positive number.

5. The method of claim 1, further comprising:

if the IP address of the smartphone is not identical to the IP address of said computer as determined by said first server, then:
utilizing a previously-obtained IP address, that was obtained in response to a previous Push Notification to said Mobile App on said smartphone, instead of using a freshly-obtained IP address of said smartphone;
wherein step (f) comprises: if (i) the IP address of said computer as determined by said first server, is not identical to (ii) any IP address of the smartphone that was obtained in the past T hours in response to a Push Notification to the Mobile App on the smartphone, then: determining that said computer is possibly utilized by a cyber-attacker and initiating one or more pre-defined fraud mitigation operations; wherein T is a pre-defined positive number.

6. The method of claim 1, further comprising:

if the IP address of the smartphone is not identical to the IP address of said computer as determined by said first server, then:

(A) determining that the computer is in a Wi-Fi range of a particular Wi-Fi network having a particular Service Set Identifier (SSID);

(B) in response to said Push Notification to said smartphone, determining that the smartphone, even if not connected to said particular Wi-Fi network, is within the Wi-Fi range of said particular Wi-Fi network having said particular SSID;

(C) based cumulatively on the determining of step (A) and the determining of step (B), further determining that said computer is more-probably utilized by a legitimate user and not by an attacker.

7. The method of claim 1, further comprising:

performing continuous cross-channel user authentication, to continuously authenticate said user that remains logged-in on said computer, by periodically sending Push Notifications to said Mobile App on said smartphone, and periodically checking that IP addresses that were extracted from responses to the Push Notifications match the IP address of said computer.

8. The method of claim 1, further comprising:

in response to said Push Notification, further obtaining a geo-location of said smartphone;
obtaining a geo-location of said computer, by said first server;
determining if the geo-location of said computer, is distant by at least N kilometers from any geo-location of said smartphone in the past D days, wherein D is a pre-defined positive number, then: determining that said computer is possibly utilized by a cyber-attacker and initiating one or more pre-defined fraud mitigation operations; wherein D is a pre-defined positive number.

9. The method of claim 1, further comprising:

obtaining from said smartphone, in response to said Push Notification to said Mobile App, device orientation data;
detecting that said first server is accessed via a web browser running on a smartphone, and obtaining by said first server device orientation data of said smartphone using a method that does not rely on any Push Notification to any Mobile App;
if (I) device orientation data of said smartphone, as obtained from said smartphone in response to said Push Notification, is different from (II) device orientation data of said smartphone as obtained from said smartphone using a method that does not rely on any Push Notification to any Mobile App, then: determining that said computer is possibly utilized by a cyber-attacker and initiating one or more pre-defined fraud mitigation operations.

10. The method of claim 1, further comprising:

obtaining from said smartphone, in response to said Push Notification to said Mobile App, device motion data;
detecting that said first server is accessed via a web browser running on a smartphone, and obtaining by said first server device motion data of said smartphone using a method that does not rely on any Push Notification to any Mobile App;
if (I) device motion data of said smartphone, as obtained from said smartphone in response to said Push Notification, is different from (II) device motion data of said smartphone as obtained from said smartphone using a method that does not rely on any Push Notification to any Mobile App, then: determining that said computer is possibly utilized by a cyber-attacker and initiating one or more pre-defined fraud mitigation operations.

11. The method of claim 1, further comprising:
in response to said Push Notification, receiving from said smartphone a signal indicating that said smartphone is currently being utilized in a voice call;
determining that the smartphone is being utilized in a voice call in parallel to utilization of said computer for logging-in via said web browser, and determining that the log-in is possibly fraudulent, and initiating fraud mitigation operations.

12. The method of claim 1,
wherein the first server is a server of an online retailer;
wherein the second server is a server of a financial service;
wherein cross-channel authentication for a log-in into the user-account at said online retailer, is performed by using a Push Notification to a Mobile App of said financial service.

13. The method of claim 1,
wherein the first server is a server of an online retailer;
wherein the second server is a server of a financial service;
wherein cross-channel authentication is performed as part of a non-logged-in guest checkout process at said online retailer, and utilizes a Push Notification to a Mobile App of said financial service.

14. The method of claim 1,
wherein steps (a) to (c) are skipped, and instead of them, the IP address of the computer is extracted directly by the second server from payment information that is submitted via said computer to said second server while the user is visiting an online venue that is not operated by said second server.

15. The method of claim 1,
wherein the first server is a server of a financial service;
wherein the second server is a server of a retailer;
wherein cross-channel authentication for a log-in into the user-account at said financial service, is performed by using a Push Notification to a Mobile App of said retailer.

16. The method of claim 1, comprising:
determining whether a current user is a genuine user or an attacker,
based cumulatively on:
(I) whether or not the IP address of the computer, is identical to the IP address of the smartphone as obtained from the response to the Push Notification;
(II) an analysis of user interactions and device communication, that estimates whether (i) the user is located physically next to said computer or (ii) the user is a remote attacker that remotely controls said computer via a Remote Access Trojan (RAT) or other malware.

17. The method of claim 1,
wherein the user-authentication data in step (a) comprises at least one of:
a username and a password,
a username and a Personal Identification Number (PIN),
an email address and a password,
an email address and a PIN,
a scan of a fingerprint,
a scan of a palm,
a scan of a retina,
an image of a face,
a voice sample,
a password-less token that identifies the user.

18. A method comprising:
(a) receiving log-in data or user-authentication data, that a user submits or provides to a first server via a web browser operated on an unverified electronic device;
(b) determining, at said first server, that said log-in data or user-authentication data matches credentials that were established for a particular user-account that is served by said first server;
(c) determining, at said first server, an Internet Protocol (IP) address of said unverified electronic device, by extracting the IP address that said unverified electronic device advertises to Internet servers;
(d) determining, at said first server, that said particular user-account is associated with a Mobile App that was installed on a verified electronic device of an account-owner of said particular user-account;
(e) sending, by said first server or by a second server which is an applications server, a Push Notification to said Mobile App that was installed on the verified electronic device of said account-owner; and triggering the verified electronic device, via said Push Notification, to respond with a response that includes therein an Internet Protocol (IP) address of said verified electronic device;
(f) if (I) the IP address of the verified electronic device, that was obtained in step (e) in response to said Push Notification, is different from (II) the IP address of said unverified electronic device as determined in step (c) by said first server, then: determining that said unverified electronic device is possibly utilized by a cyber-attacker, and initiating one or more pre-defined fraud mitigation operations.

19. A system comprising:
one or more hardware processors, that are configured to execute code,
and that are operably associated with one or more memory units that are configured to store code;
wherein the one or more hardware processors are configured to perform a process comprising:
(a) receiving user log-in data or user-authentication data, that a user submits or provides to a first server via a web browser operated on a computer that is selected from the group consisting of: a laptop computer, a desktop computer;
(b) determining, at said first server, that said user log-in data or user-authentication data matches credentials that were established for a particular user-account that is served by said first server;
(c) determining, at said first server, an Internet Protocol (IP) address of said computer, by extracting the IP address that said computer advertises to Internet servers;
(d) determining, at said first server, that said particular user-account is associated with a Mobile App that was installed on a smartphone of an account-owner of said particular user-account;
(e) sending, by said first server or by a second server which is an applications server, a Push Notification to said Mobile App that was installed on the smartphone of said account-owner; and triggering the smartphone, via said Push Notification, to respond with a response that includes therein an Internet Protocol (IP) address of said smartphone;
(f) if (I) the IP address of the smartphone, that was obtained in step (e) in response to said Push Notification, is different from (II) the IP address of said computer as determined in step (c) by said first server, then: determining that said computer is possibly utilized by a cyber-attacker, and initiating one or more pre-defined fraud mitigation operations.

20. A system comprising:

one or more hardware processors, that are configured to execute code, and that are operably associated with one or more memory units that are configured to store code;

wherein the one or more hardware processors are configured to perform a process comprising:

(a) receiving log-in data or user-authentication data, that a user submits or provides to a first server via a web browser operated on an unverified electronic device;

(b) determining, at said first server, that said log-in data or user-authentication data matches credentials that were established for a particular user-account that is served by said first server;

(c) determining, at said first server, an Internet Protocol (IP) address of said unverified electronic device, by extracting the IP address that said unverified electronic device advertises to Internet servers;

(d) determining, at said first server, that said particular user-account is associated with a Mobile App that was installed on a verified electronic device of an account-owner of said particular user-account;

(e) sending, by said first server or by a second server which is an applications server, a Push Notification to said Mobile App that was installed on the verified electronic device of said account-owner; and triggering the verified electronic device, via said Push Notification, to respond with a response that includes therein an Internet Protocol (IP) address of said verified electronic device;

(f) if (I) the IP address of the verified electronic device, that was obtained in step (e) in response to said Push Notification, is different from (II) the IP address of said unverified electronic device as determined in step (c) by said first server, then: determining that said unverified electronic device is possibly utilized by a cyber-attacker, and initiating one or more pre-defined fraud mitigation operations.

\* \* \* \* \*